United States Patent
Mayor et al.

(10) Patent No.: US 8,391,713 B2
(45) Date of Patent: Mar. 5, 2013

(54) TESTING OPTICAL NETWORKS

(75) Inventors: Dagmar D. Mayor, Fallston, MD (US); Robert A. Quan, Hicksville, NY (US); Hwei-Yu L. Hsieh, Silver Spring, MD (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 682 days.

(21) Appl. No.: 12/582,916

(22) Filed: Oct. 21, 2009

(65) Prior Publication Data

US 2011/0091208 A1 Apr. 21, 2011

Related U.S. Application Data

(60) Provisional application No. 61/252,348, filed on Oct. 16, 2009.

(51) Int. Cl.
*H04B 17/00* (2006.01)
*H04B 10/08* (2006.01)
*H04J 14/00* (2006.01)

(52) U.S. Cl. ............................................. 398/66; 398/25
(58) Field of Classification Search ........... 398/9, 25–28
See application file for complete search history.

(56) References Cited

U.S. PATENT DOCUMENTS

| 5,450,224 | A  | * | 9/1995  | Johansson ........................ 398/50 |
| 6,362,905 | B1 | * | 3/2002  | Fukashiro et al. ............... 398/82 |
| 7,865,077 | B2 | * | 1/2011  | Mukojima ........................ 398/1 |
| 2002/0166956 | A1 | * | 11/2002 | Graves ...................... 250/227.23 |
| 2006/0127087 | A1 | * | 6/2006  | Kasai et al. ..................... 398/45 |
| 2007/0212072 | A1 | * | 9/2007  | Iannone et al. ................. 398/72 |
| 2008/0002978 | A1 | * | 1/2008  | Onaka et al. ................... 398/81 |
| 2008/0089692 | A1 | * | 4/2008  | Sorin .............................. 398/135 |
| 2009/0226167 | A1 | * | 9/2009  | Onaka et al. ................... 398/45 |
| 2010/0067901 | A1 | * | 3/2010  | Mizutani et al. ................ 398/20 |
| 2010/0098407 | A1 | * | 4/2010  | Goswami et al. ................ 398/5 |
| 2010/0150563 | A1 | * | 6/2010  | Nakajima ...................... 398/81 |
| 2011/0135074 | A1 | * | 6/2011  | McNaughton et al. .... 379/93.02 |

* cited by examiner

*Primary Examiner* — Nathan Curs
*Assistant Examiner* — Tanya Ngo

(57) ABSTRACT

A device may include a communication interface to communicate with an optical line terminal and a processor. The processor may set an optical path from the optical line terminal to an optical network terminal, the optical path including one or more optical network elements. In addition, the processor may obtain, from the optical line terminal, a status reading of the optical network terminal when the optical path is set. Further, the processor may obtain, from the optical line terminal, a power reading at the optical network terminal when the optical path is set. The processor may record the status reading and the power reading.

20 Claims, 6 Drawing Sheets

TESTING OPTICAL NETWORKS

RELATED APPLICATION

This application claims priority under 35 U.S.C. §119 based on U.S. Provisional Patent Application No. 61/252,348 filed Oct. 16, 2009, the disclosure of which is incorporated by reference herein in its entirety.

BACKGROUND INFORMATION

To ensure that an optical network and its components operate properly in the field, the optical network may be analyzed in a test bed.

DETAILED DESCRIPTION OF PREFERRED EMBODIMENTS

The following detailed description refers to the accompanying drawings. The same reference numbers in different drawings may identify the same or similar elements.

As described below, a system may test optical network components and/or configurations that are to be implemented or deployed in the field. For example, the system may range an optical network terminal to determine a maximum length of an optical fiber that may interconnect an optical network terminal and an optical line terminal for communication.

Figure 1:
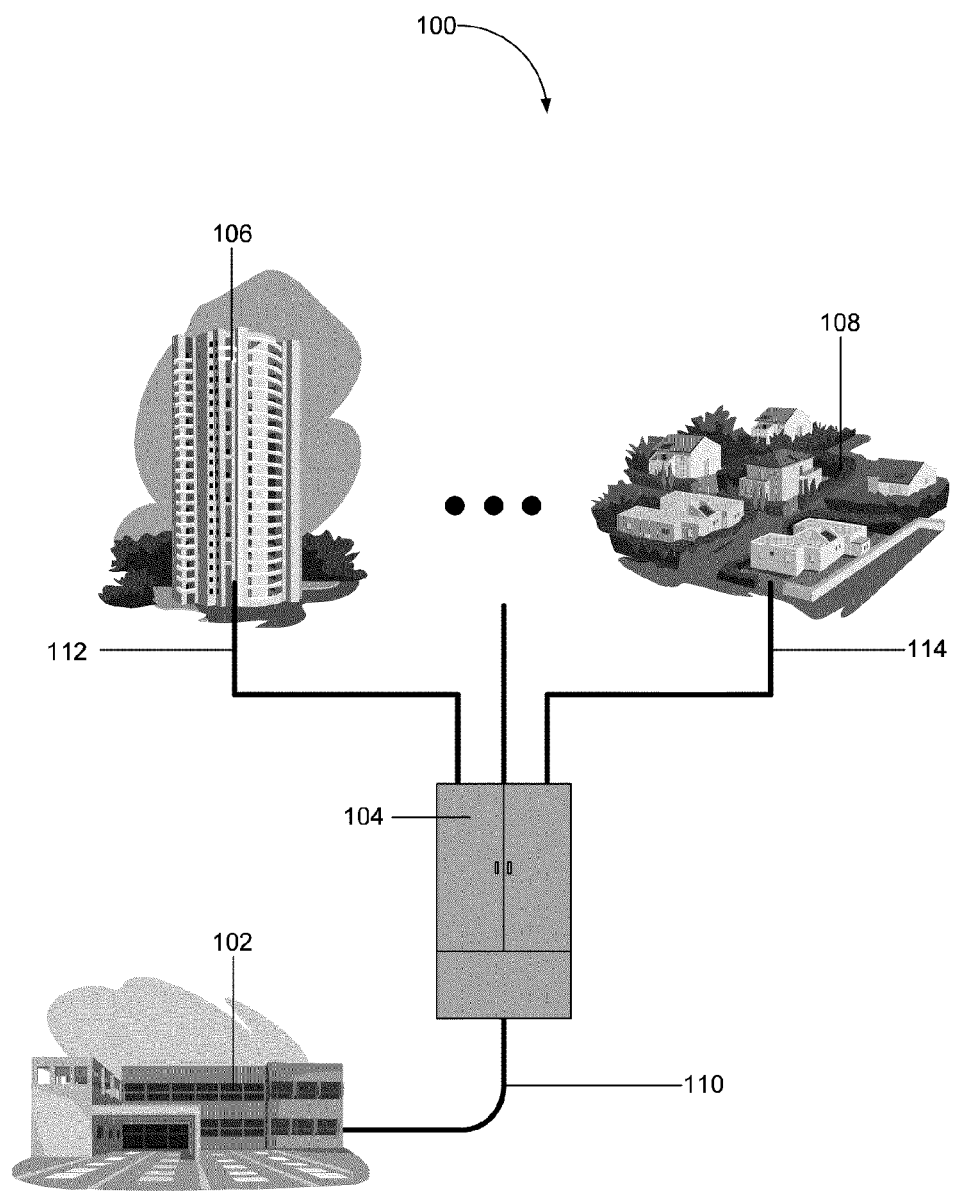
FIG. 1 shows an exemplary optical network.
Figure 2:
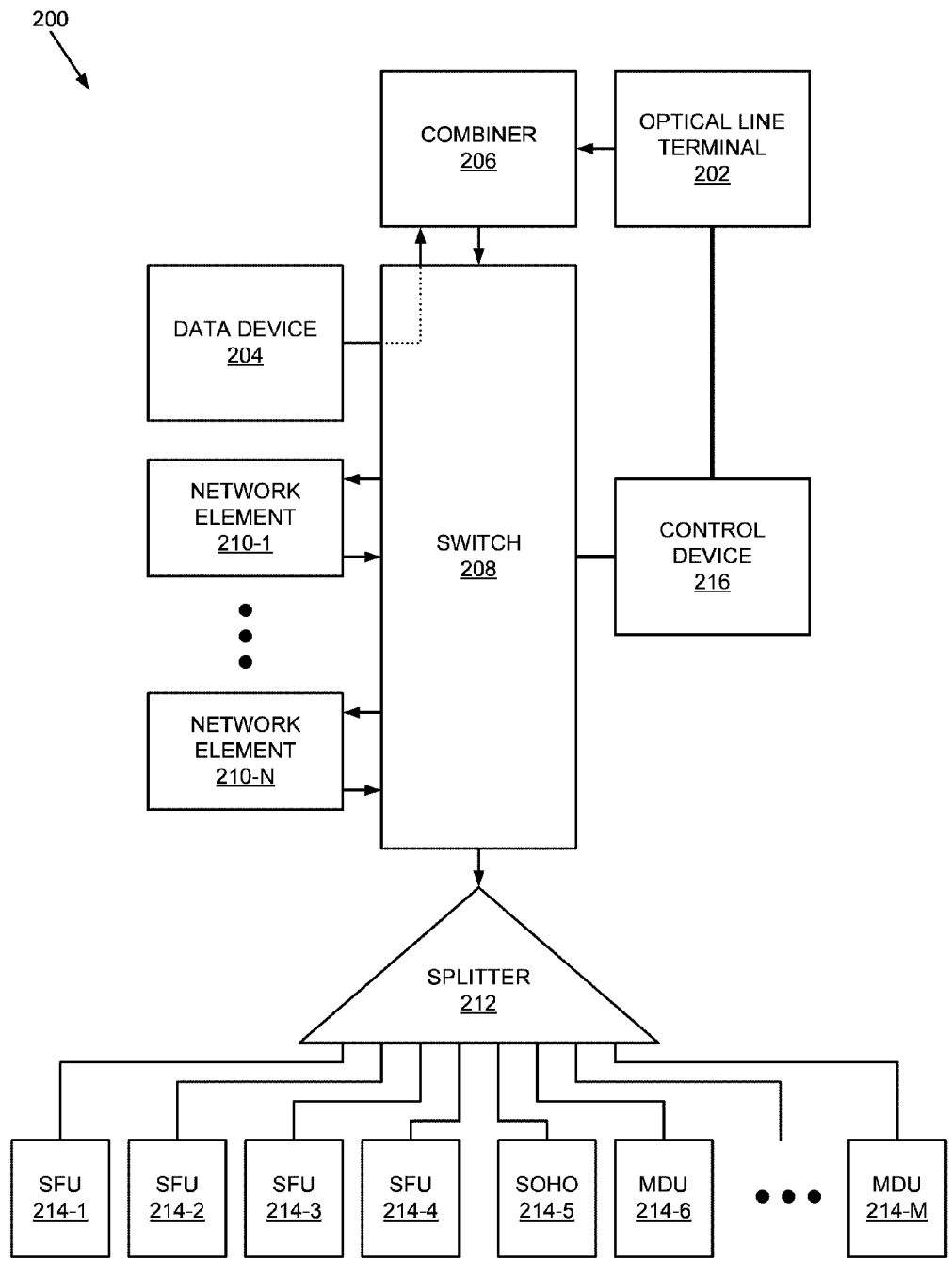
FIG. 2 shows an exemplary system for testing optical network components.

FIG. 1 shows an exemplary passive optical network that may be implemented or deployed, and FIG. 2 shows a system for testing such configurations and/or components. As shown in FIG. 1, optical network 100, which may be referred to as a fiber-to-the-premises (FTTP) network, may include a central office 102, a fiber distribution hub 104, a multiple dwelling unit complex 106, a single dwelling unit complex 108, and optical fiber cables 110-114. An actual optical network may include may include additional, fewer, or different dwelling complexes and components than optical network 100. For example, an actual optical network may include additional dwelling complexes, fiber distribution hubs, optical fiber cables, and central offices.

Central office 102 may include a site that houses telecommunication equipment, such as switches, optical line terminals, etc. Central office 102 may provide telecommunication services to subscribers, such as telephone service, access to the Internet, cable television programs, etc., via optical line terminals.

Fiber distribution hub 104 may include an enclosure (e.g., a plastic or metal cabinet) to receive optical fiber cable 110, split an optical signal on an optical fiber within optical fiber cable 110 into multiple optical signals via an optical splitter(s), and convey the split optical signals from optical splitter(s) to optical fiber cables 112 and 114.

Multiple dwelling unit (MDU) complex 106 may include apartments, condominiums, and/or other types of living units that are aggregated in a high-rise or another type of building. Single dwelling unit (SDU) complex 108 may include attached town houses, single detached houses, condominiums, and/or other types of horizontally aggregated living units. Although not illustrated in FIG. 1, optical network 100 may include other types of premises (e.g., single-office single-house (SOHO), etc.).

Optical fiber cable 110 may interconnect an optical line terminal in central office 102 to an optical splitter in fiber distribution hub 104. Optical fiber cables 112 and 114 may interconnect the optical splitter in fiber distribution hub 104 to optical network terminals in MDUs in MDU complex 106 and SDUs in SDU complex 108.

In some situations, optical network 100 may not function properly, due to, for example, loss of signal power at junctions between components, mechanical stress, etc. To ensure that optical network 100 operates correctly, a system may emulate optical network 100 or portions of optical network 100 in different configurations, and analyze or test the emulated network.

FIG. 2 shows an exemplary system 200 for testing or analyzing passive optical network 100. As shown, system 200 may include an optical line terminal 202, data device 204, combiner 206, switch 208, network elements 210-1 through 210-N (collectively "network elements 210" and individually "network element 210-$x$"), optical splitter 212, optical network terminals (ONTs) or units 214-1 through 214-M for SFUs, MDUs, SOHOs, etc. (collectively "optical network terminals 214" and individually "optical network terminal 214-$x$"), and control device 216. Depending on the implementation, system 200 may include additional, fewer, or different components than those illustrated in FIG. 2.

Optical line terminal 202 may provide communication services to optical network terminals 214. In providing the communication services, optical line terminal 202 may send downstream data (e.g., over a 1490 nanometer (nm) carrier), receive upstream data from optical network terminals 214 (e.g., over a 1310 nm carrier), schedule times at which optical network terminals 214 are to send data upstream, etc. In addition, optical line terminal 202 may provide interfaces for managing optical line terminal 202. Users or other devices may control and/or interact with optical line terminal 202 through the interfaces.

Data device 204 may send data (e.g., video data over a 1550 nm carrier) to combiner 206. In an exemplary implementation, data device 204 may include an erbium-doped fiber amplifier. Combiner 206 may combine the signals from data device 204 and the output of optical line terminal 202. The combined signals from the output of combiner 206 may be input to switch 208.

Switch 208 may receive the optical signals from combiner 206 and route the optical signals to optical splitter 212. Depending on its configuration, switch 208 may switch one or more of network elements 210 into the route. For example, switch 208 may route the optical signals from combiner 206 through network element 210-1 and not other network elements 210 in accordance with a command or instruction from another device. In addition, depending on the configuration, switch 208 may route optical signals from data device 204 to combiner 206 or prevent the optical signals from reaching combiner 206. In an exemplary implementation, switch 208 may include a fiber optic cross-connect system.

Network element 210-$x$ may include an optical component, such as an optical fiber, regenerator, optical amplifier, or any other type of optical network component. In the following description, however, it will be assumed that network elements 210 include optical fibers of different lengths (e.g., 10,000, 32,000, 65,000 feet, etc.).

Optical splitter 212 may receive an optical signal over an optical fiber, split the optical signal into multiple optical signals, and transmit the multiple optical signals to optical network terminals 214.

Optical network terminal 214-x may receive optical signals and convert the received optical signals into electrical signals that are further processed or carried over, for example, copper wires to network devices in premises (e.g., MDUs, SFUs, SOHOs, etc.). In addition, optical network terminal 214-x may send upstream data, diagnostic signals and/or other signals to optical line terminal 202. In some implementations, optical network terminal 214-x may include a triplexer for receiving and/or sending data over different carrier wavelengths.

Control device 216 may communicate with and/or control optical line terminal 202 and switch 208 via interfaces provided by optical line terminal 202 and switch 208, respectively. For example, control device 216 may cause switch 208 to include/exclude particular network elements 210, and, via the interfaces in optical line terminal 202, obtain status and power readings for each of optical network terminals 214.

Figure 3:
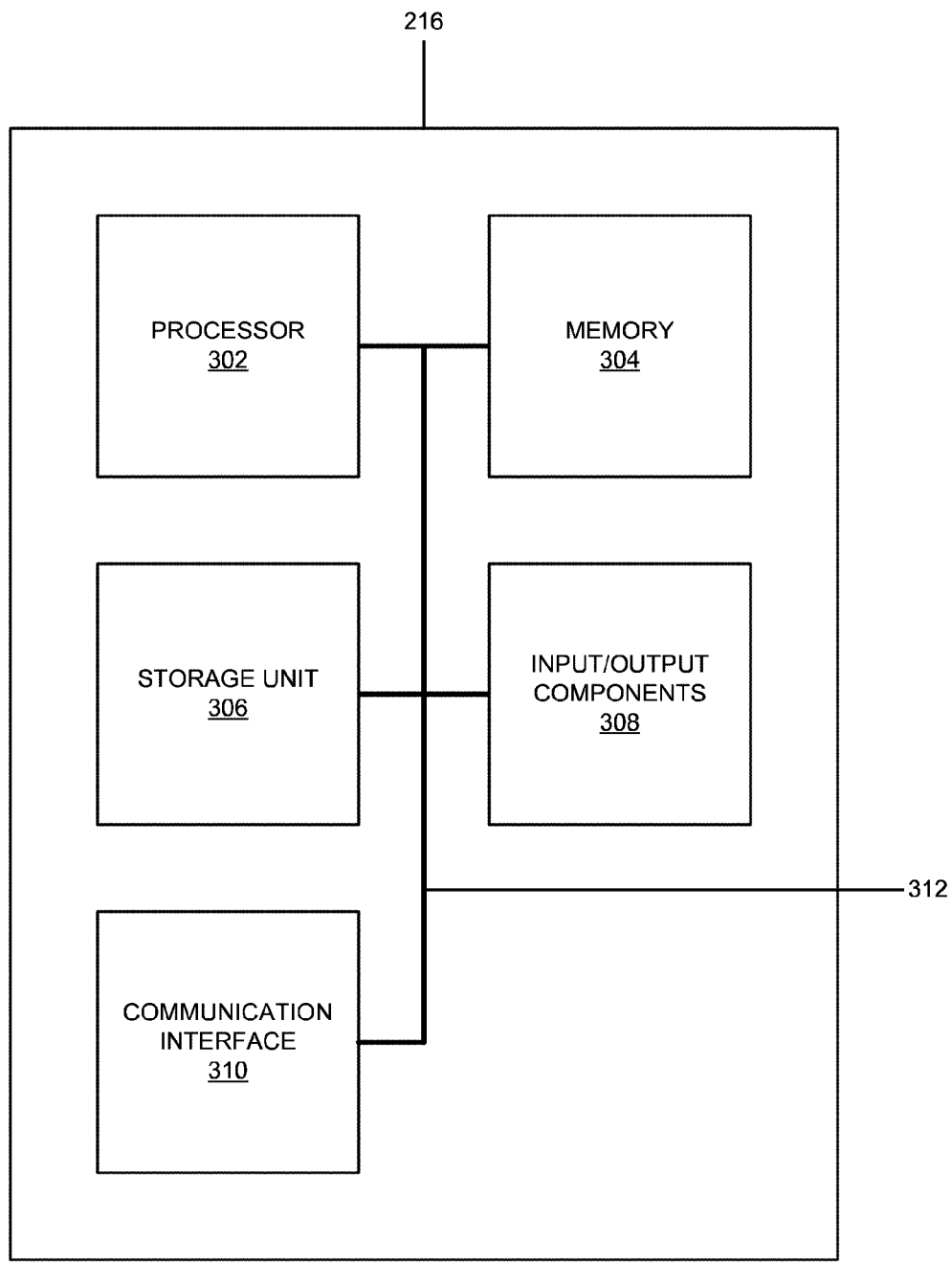
FIG. 3 is a block diagram of an exemplary control device of FIG. 2.

FIG. 3 is a block diagram of exemplary components of control device 216. As shown, control device 216 may include a processor 302, memory 304, storage unit 306, input/output components 308, communication interface 310, and bus 312. Depending on the implementation, control device 216 may include fewer, additional, or different components than those illustrated in FIG. 3.

Processor 302 may include one or more processors, microprocessors, application specific integrated circuits (ASICs), field programmable gate arrays (FPGAs), or other processing logic that may interpret and execute instructions. Memory 304 may include static memory, such as read only memory (ROM), and/or dynamic memory, such as random access memory (RAM), or onboard cache, for storing data and machine-readable instructions. Storage unit 306 may include a magnetic and/or optical storage/recording medium. In some implementations, storage unit 306 may be mounted under a directory or mapped to a drive.

Input/output components 308 may include a display (e.g., a cathode ray tube, a liquid crystal display (LCD), an organic light emitting diode (OLED) display, etc.), a keyboard, a mouse, a speaker, a microphone, a Digital Video Disk (DVD) writer, a DVD reader, Universal Serial Bus (USB) ports, and/or other types of components for converting physical events or phenomena to and/or from digital signals that pertain to control device 216.

Communication interface 310 may include any transceiver-like mechanism that enables control device 216 to communicate with other devices and/or systems. For example, communication interface 310 may include mechanisms for communicating via a network, such as a wireless, wireless, or optical network. Communication interface 310 may also include a modem or an Ethernet interface to a LAN or other network for communicating with other devices. Bus 312 may provide an interface through which components of control device 216 can communicate with one another.

Figure 4:
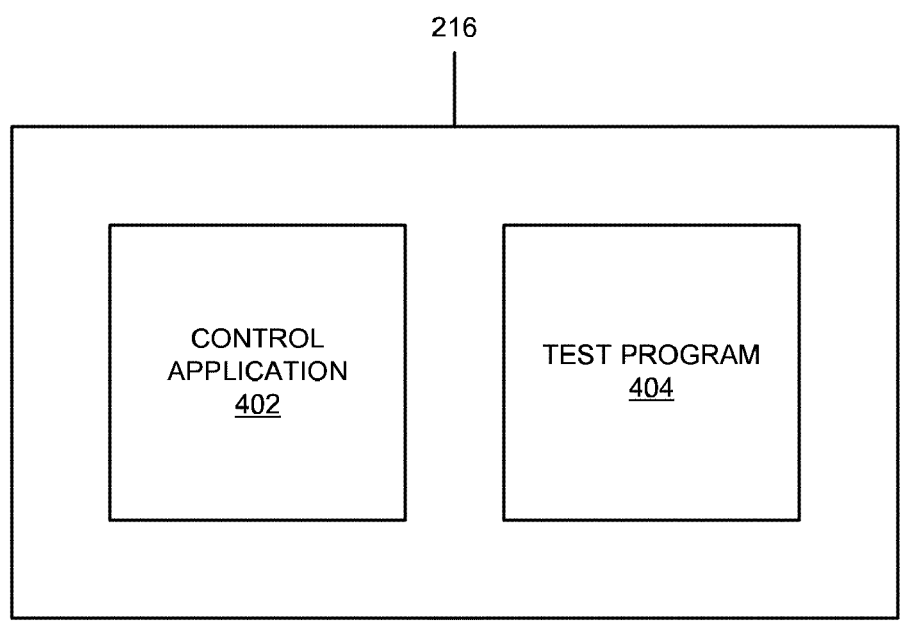
FIG. 4 illustrates exemplary functional components of the control device of FIG. 2.

FIG. 4 is a functional block diagram of exemplary components of control device 216. As shown, control device 216 may include a control application 402 and a test program 404. Depending on the implementation, control device 216 may include additional, fewer, or different components than those illustrated in FIG. 4 (e.g., an operating system, browser, email client, instant messaging client, etc.).

Control application 402 may include components for issuing commands to or obtaining data from optical line terminal 202 and switch 208 in accordance with test program 404. In some implementations, control application 402 may provide a user interface (e.g., graphical user interface, text user interface, etc.) for a tester/programmer to compose a program or script (e.g., graphical program, text-based script, flow-based program, etc.). Control application 402 may interpret, compile and/or execute the program. Alternatively, control application 402 may be implemented as a library of functions, which may be compiled and linked, together with test code, into executable code (e.g., binaries) via a separate compiler.

Test program 404 may, via control application 402, issues commands and/or exchange messages with optical line terminal 202 and switch 208. The commands may request switch 208 to change optical paths in system 200 through different network elements 210, or request optical line terminal 202 to relay power readings or operating statuses of each of optical network terminals 214 to control device 216.

Figure 5:
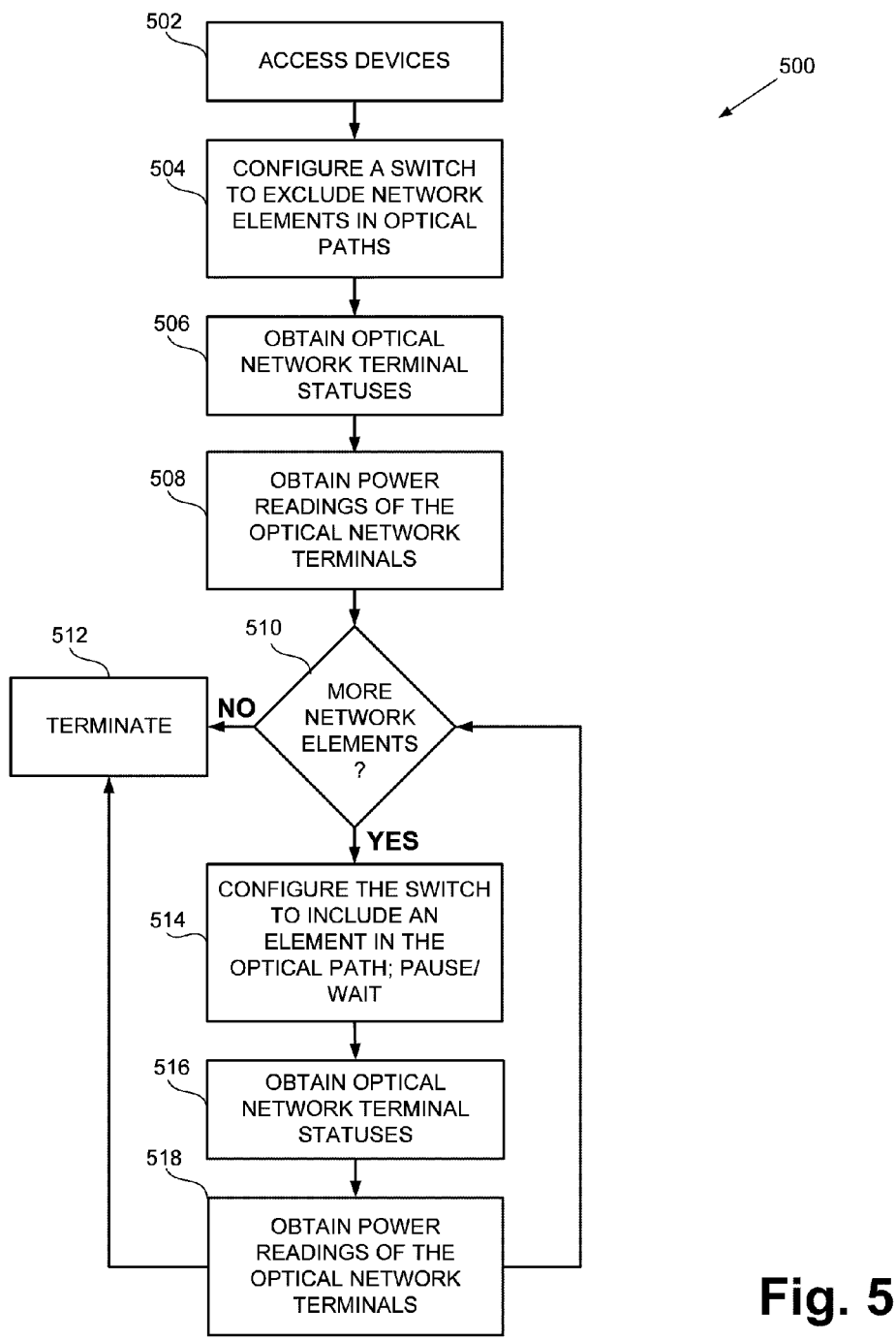
FIG. 5 is a flow diagram of an exemplary process that is associated with the system of FIG. 2.

FIG. 5 is a flow diagram of an exemplary process 500 that is associated with control device 216 and test program 404 of FIG. 4. Assume that test program 404 is running (e.g., via an operating system or control application 402). At block 502, control device 216 may access devices of system 200 (block 502). For example, control device 216 and/or a user associated with control device 216 (e.g., a network engineer) may log onto or establish communication with optical line terminal 202 and switch 208 over a local network.

Control device 216 may configure switch 208 to exclude network elements 210 in optical paths from optical line terminal 202 to optical network terminal 214 (block 504). In response to commands from control device 216, switch 208 may remove cross-connects that divert the optical signals from combiner 206 into one or more of network elements 210. Consequently, the optical signals from combiner 206 may pass directly through optical splitter 212 to optical network terminals 214. For example, assume that system includes one network element 210-1, and network element 210-1 is a 10,000 (10K) foot (ft) optical fiber. In such a case, the optical signals from combiner 206 may be routed directly to optical splitter 212 without passing through the 10K ft optical fiber.

Control device 216 may obtain optical network terminal statuses (block 506). To obtain the optical network terminal statuses, control device 216 may request, for example, optical line terminal 202 to obtain readings from each of optical network terminals 214. In response, optical line terminal 202 may obtain a reading of, for example, in-service and normal (IS-NR) from optical network device 214-1 and relay the IS-NR indication to control device 216. Control device 216 may record the reading.

Optical line terminal 202 may obtain different readings (e.g., out-of-service and autonomous (OOS-AU), etc.), depending on the operating condition of optical network terminals 214. Further, if optical line terminal 202 is unable to communicate with optical network terminal 214-x, optical line terminal 202 may indicate the error condition to control device 216.

Control device 216 may also obtain power readings from optical network terminals 214 (block 508). In one implementation, control device 216 may request optical line terminal 202 to relay the power readings of optical signals at optical network terminals 214. Subsequently, control device 216 may record each of the power readings.

Control device 216 may determine whether there are more network elements 210 for testing (block 510). Proceeding with the example described for block 504, control device 216 may determine that system 200 has not yet run a test with network element 210-1 in the optical path between optical line terminal 202 and optical network terminal 214.

If there are no more network elements 210 for which system 200 may perform tests (block 510—NO), process 500 may terminate (block 512). Otherwise (block 510—YES), control device 216 may configure switch 208 to include network element 210-x, with which system 200 has not yet run a test, in the optical path (block 514). If switch 208 already incorporates a different network element 210-y in the optical path, switch 208 may remove such network element 210-y from the path. Proceeding with the above example, control device 216 may cause switch 208 to cross-connect network element 210-1 (e.g., 10K ft optical fiber) into the path from combiner 206 to optical splitter 212.

Control device 216 may wait/pause (block 514) for a particular period of time (e.g., 1.5 minutes, 2 minutes, etc.). This may allow transient effects of reconfiguring optical network paths to diminish to inconsequential levels.

Control device 216 may obtain statuses of optical network terminals 214 (block 516) with network element 210-x in the optical path, in the manner similar to that described for block 506. For example, because of inclusion of network element 210-x in the optical path, the optical path from optical line terminal 202 to optical network terminal 214-x may suffer greater power loss/degradation. This, in turn, may disrupt normal communication between optical line terminal 202 and optical network terminal 214-x. In such cases, optical line terminal 202 may relay the error condition to control device 216. In other cases, optical network terminal 214-x may directly relay the error condition from optical network terminal 214-x to control device 216.

Control device 216 may obtain power readings of optical signals at optical network terminals 214 (block 518). After block 518, process 500 may return to block 510, to test the optical path from optical line terminal 202 to optical network terminal 214 with different network element 210-x inserted in the optical path.

Figure 6:
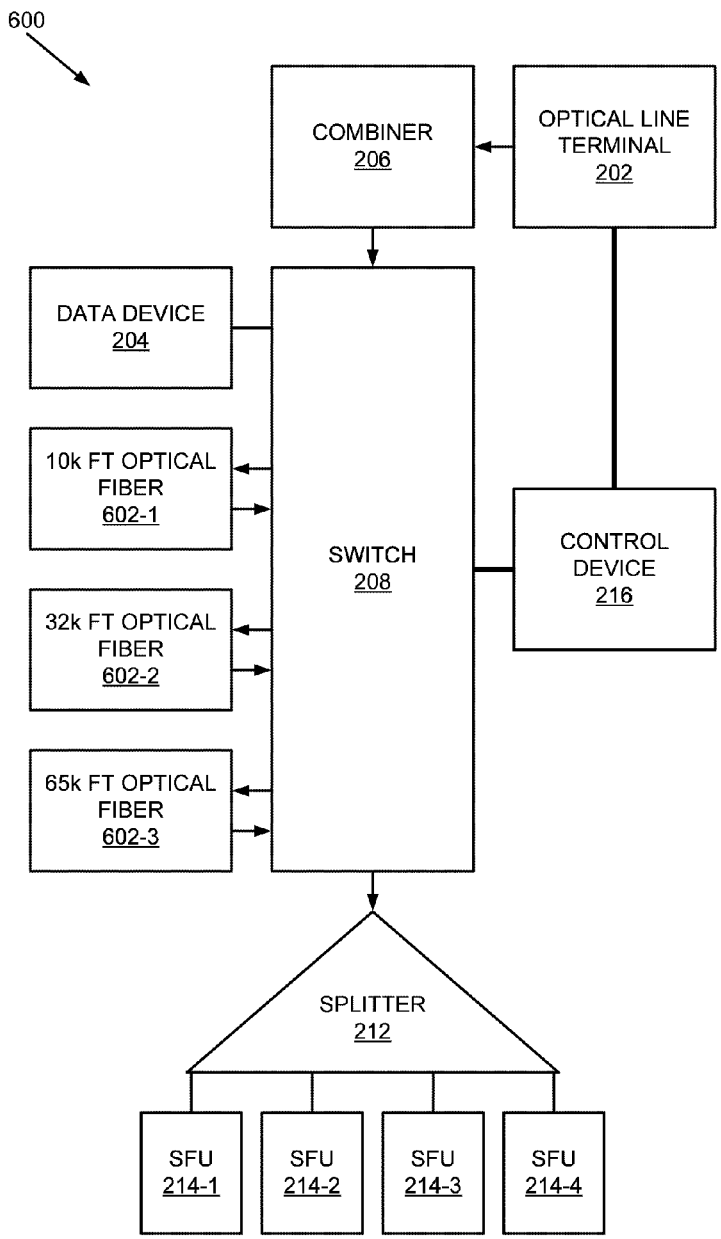
FIG. 6 illustrates an example that is associated with the exemplary process of FIG. 5.

The following example, in conjunction with FIG. 6, illustrates processes involved in testing a passive optical network in accordance with implementations described with respect to FIGS. 2 and 5.

Assume that, in a test to be run by control device 216, switch 208 is configured to prevent the output of data device 204 from being input to combiner 206. In addition, as shown in FIG. 6, assume that switch 208 is to test three network elements: a 10K ft optical fiber 602-1, a 32K ft optical fiber 602-2, and a 65K ft optical fiber 602-3.

To start the testing, control device 216 automatically logs onto or establishes communications with switch 208 and optical line terminal 202. Control device 216 issues commands to switch 208 to exclude network elements 602-1, 602-2, and 602-3 from the optical paths between optical line terminal 202 and optical network terminals 214-1 through 214-4. Controller also 216 issues commands to optical line terminal 202 to obtain the statuses and power readings of each of optical network terminals 214-1 through 214-4. Assume that optical network terminals 214-1 though 214-4 indicate IS-NR.

Control device 216 directs switch 208 to remove the cross-connect between combiner 206 and splitter 212, and create a new cross-connect to insert 10K ft optical fiber 602-1 between combiner 206 and splitter 212. Control device 216 pauses for a particular period of time (e.g., 1.5 minutes) and verifies that optical network terminals 214-1 through 214-4 are IS-NR, to avoid transient effects associated with the previous setting/configuration of switch 208.

Control device 216 repeats the above act for 32K ft optical fiber 602-2 and 65K optical fiber 602-3, obtaining the statuses and power readings at each of optical network terminals 214-1 through 214-4. Prior to obtaining the statuses and the readings for optical network terminals 214-1 through 214-4, however, control device 216 may wait for a period of time (e.g., 2 minutes).

Once the readings are obtained, control device 216 and/or another device may use the power readings to range optical network terminals 214-1 through 214-4. For example, control device 216 may determine a maximum length of an optical fiber that may interconnect an optical network terminal and an optical line terminal for reliable communications. Control device 216 may determine the maximum length by, for example, computing a length at which the optical fiber may reach a prescribed maximum power attenuation (e.g., in dB) allowable for the reliable communication. Such a computation may entail using and/or interpolating power readings, described above, from optical network terminals 214 at different optical fiber lengths (e.g., 10,000 feet, 35,000 feet, 65,000 feet, or any other lengths).

The above example illustrates how system 200 may test a passive optical network. In system 200, control device 216 may control and/or interact with optical line terminal 202 and switch 208 via interfaces provided by optical line terminal 202 and switch 208. Control device 216 may cause switch 208 to include/exclude particular network elements 210, and, via the interfaces in optical line terminal 202, obtain status readings and power readings for each of optical network terminals 214. Such readings may be used to determine whether optical network 100 operates properly.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

In addition, while a series of blocks have been described with regard to the process illustrated in FIG. 5, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
   a communication interface to communicate with an optical line terminal; and
   a processor to:
      set an optical path from the optical line terminal to an optical network terminal, the optical path including
         a combiner configured to receive output of the optical line terminal and a data device, the combiner combining the outputs to form a combined signal,
         a switch configured to switch to one or more optical network elements in the optical path, the switch receiving the combined signal from the combiner and outputting a signal attenuated by the one or more optical network elements, and
         an optical splitter configured to receive the attenuated signal, split the attenuated signal, and feed one of the split signals into the optical network terminal,
      obtain, from the optical line terminal, a status reading of the optical network terminal when the optical path is set,
      obtain, from the optical line terminal, a power reading at the optical network terminal when the optical path is set, and
      record the status reading and the power reading.

2. The device of claim 1, wherein the processor is further configured to:
   determine lengths of the optical path via which the optical network terminal reliably communicates with the optical line terminal.

3. The device of claim 1, wherein the processor is further configured to:
   route video data from a remote device to the combiner, the combiner combining data from the optical network terminal and the video data and sending the combined data to the optical path.

4. The device of claim 3, wherein the remote device includes:
   an erbium doped fiber amplifier.

5. The device of claim 1, wherein the one or more optical network elements include optical fiber loops having different lengths.

6. The device of claim 1, wherein the optical network terminal includes a triplexer.

7. The device of claim 1, wherein when the processor sets the optical path, the processor is further configured to:
   issue one or more commands to the switch to include one of the one or more optical network elements in the optical path.

8. The device of claim 7, wherein the switch includes:
   a cross-connect.

9. The device of claim 1, wherein when obtaining the status reading, the processor is configured to obtain in-service and normal (IS-NR) indication.

10. The device of claim 1, wherein after the processor sets the optical path, the processor is further configured to:
    wait for a predetermined amount of time before the processor obtains the status reading or the power reading.

11. The device of claim 1, wherein the optical network terminal includes an optical line terminal for at least one of:
    a multi-dwelling unit;
    a single dwelling unit; or
    a single-home single-office.

12. A method comprising:
    setting an optical path from a combiner to an optical splitter, the optical path including an optical fiber loop through a switch configured to switch to one or more optical network elements in the optical path, the switch receiving a combined signal formed from outputs of a data device and the combiner and outputting a signal attenuated by the one or more optical network elements,
    obtaining, when the optical path is set, from an optical line terminal that provides input to the combiner, a status reading of an optical network terminal that receives the attenuated signal output of the optical splitter,
    obtaining, when the optical path is set, from the optical line terminal, a power reading at the optical network terminal, and
    ranging the optical network terminal based on the status reading and the power reading.

13. The method of claim 12, wherein setting the optical path includes:
    issuing commands to a cross-connect switch to include the optical fiber loop in the optical path.

14. The method of claim 12, further comprising:
    waiting for a predetermined amount of time after setting the optical path to obtain the status reading.

15. The method of claim 12, further comprising at least one of:
    establishing communication with the optical line terminal; or
    establishing communication with the switch.

16. The method of claim 12, further comprising:
    sending video data from erbium-doped fiber optic amplifier to the combiner.

17. A system comprising:
    an optical network terminal;
    an optical line terminal to communicate with the optical network terminal;
    an optical path between the optical network terminal and the optical line terminal, the optical path including:
       a combiner configured to receive output of the optical line terminal and a data device, the combiner combining the outputs to produce a combined signal,
       a switch configured to switch to one or more network elements in the optical path, the switch receiving the combined signal from the combiner and outputting a signal attenuated by the one or more network elements, and
       an optical splitter configured to receive the attenuated signal, split the attenuated signal, and feed one of the split signals into the optical network terminal; and
    a control device configured to obtain, from the optical line terminal, power and status readings of the optical network terminal.

18. The system of claim 17, wherein the optical network terminal includes a triplexer.

19. The system of claim 17, wherein the optical network elements include a plurality of optical fibers, each of the optical fibers having a length ranging from about 10,000 feet to about 65,000 feet.

20. The system of claim 19, where wherein the control device is further configured to obtain the power and status readings to identify a maximum length of the optical fibers.

* * * * *